United States Patent [19]
Ferrero

[11] Patent Number: 5,632,377
[45] Date of Patent: May 27, 1997

[54] CONTAINER FOR FOOD PRODUCTS SUCH AS CONFECTIONERY IN THE SHAPE OF A JOINTED TOY

[75] Inventor: Pietro Ferrero, Genese, Belgium

[73] Assignee: Soremartec S.A., Arlon-Schoppach, Belgium

[21] Appl. No.: 387,748

[22] PCT Filed: Aug. 16, 1993

[86] PCT No.: PCT/EP93/02177

§ 371 Date: Mar. 22, 1995

§ 102(e) Date: Mar. 22, 1995

[87] PCT Pub. No.: WO94/04441

PCT Pub. Date: Mar. 3, 1994

[30] Foreign Application Priority Data

Aug. 19, 1992 [CH] Switzerland ............... 2584/92

[51] Int. Cl.⁶ ............... B65D 69/00; A63H 3/00
[52] U.S. Cl. ............... 206/457; 446/73; 446/77
[58] Field of Search ............... 206/457, 216; 220/DIG. 13, 4.26; 446/69, 71, 72, 73, 74, 75, 76, 77; 70/287, 288, 289; 273/156, 157, 160; 229/116.3, 116.4; D9/309, 310, 311, 318; D21/156, 157, 158, 159, 160, 161, 162, 163, 164, 165, 166, 167

[56] References Cited

U.S. PATENT DOCUMENTS

| | | | |
|---|---|---|---|
| D. 306,692 | 3/1990 | Ferrero | D9/318 |
| 2,096,872 | 10/1937 | Baker | 229/116.3 |
| 2,532,729 | 12/1950 | Millstein | |
| 2,823,490 | 2/1958 | Griem | |
| 2,975,547 | 3/1961 | Greve | 446/77 |
| 2,998,896 | 9/1961 | Miller | 220/4.26 |
| 3,354,576 | 11/1967 | Gralnick | 206/457 X |
| 3,520,078 | 7/1970 | Klamer | 446/73 |
| 3,741,379 | 6/1973 | Kappler et al. | 206/457 |
| 3,827,162 | 8/1974 | Moeser | 273/160 X |
| 4,593,817 | 6/1986 | Ferrero | |
| 5,378,184 | 1/1995 | Bro et al. | 446/99 |

FOREIGN PATENT DOCUMENTS 2521560 12/1976 Germany.

*Primary Examiner*—Bryon P. Gehman
*Attorney, Agent, or Firm*—Rothwell, Figg, Ernst & Kurz, P.C.

[57] ABSTRACT

A container for, for example, food products such as confectionery, is formed from a casing and one or more auxiliary bodies associated with and affixed to the casing to give the container an animal-like or human-like appearance. The auxiliary body or bodies affixed to the casing can take the form of human-like or animal-like features and can be moved relative to the casing both by rotation about the longitudinal axis of the body and by variation of the position of the longitudinal axis of the body relative to the case by sliding the body along a circular path. This provides a container which also may be used as a toy.

12 Claims, 4 Drawing Sheets

CONTAINER FOR FOOD PRODUCTS SUCH AS CONFECTIONERY IN THE SHAPE OF A JOINTED TOY

BACKGROUND OF THE INVENTION

The present invention relates to containers, for example for food products such as confectionery, and concerns in particular a container comprising a casing and at least one associated auxiliary body fixed to the casing and able to give the container itself, for instance animal-like or human-like features. A container of this type is described, for example, in U.S. Pat. No. 4,593,817.

The container described in the above patent generally has a fixed configuration in the sense that, while it may be opened for the removal of the products (for example chocolate eggs) contained within, it has the form of a rigid animal or puppet with no capacity for movement.

In a field of use such as that of containers for food products, and in particular containers for confectionery for children, there is a perceived need to give the containers an ever greater play potential, a requirement which is fairly difficult to satisfy with conventional containers.

SUMMARY OF THE INVENTION

The aim of the present invention is to provide a container which has been improved from this point of view, particularly as regards the possibility of providing, for example, a container taking the form of a puppet or a small animal which may take up various poses chosen by the user.

According to the present invention, this object is achieved by a container having the characteristics specified in claim 1. Advantageous developments of the invention are the subject of the claims which follow.

BRIEF DESCRIPTION OF THE DRAWINGS

The invention will now be described, purely by way of non-limitative example, with reference to the appended drawings, in which.

DESCRIPTION OF PREFERRED EMBODIMENTS

Figure 1:
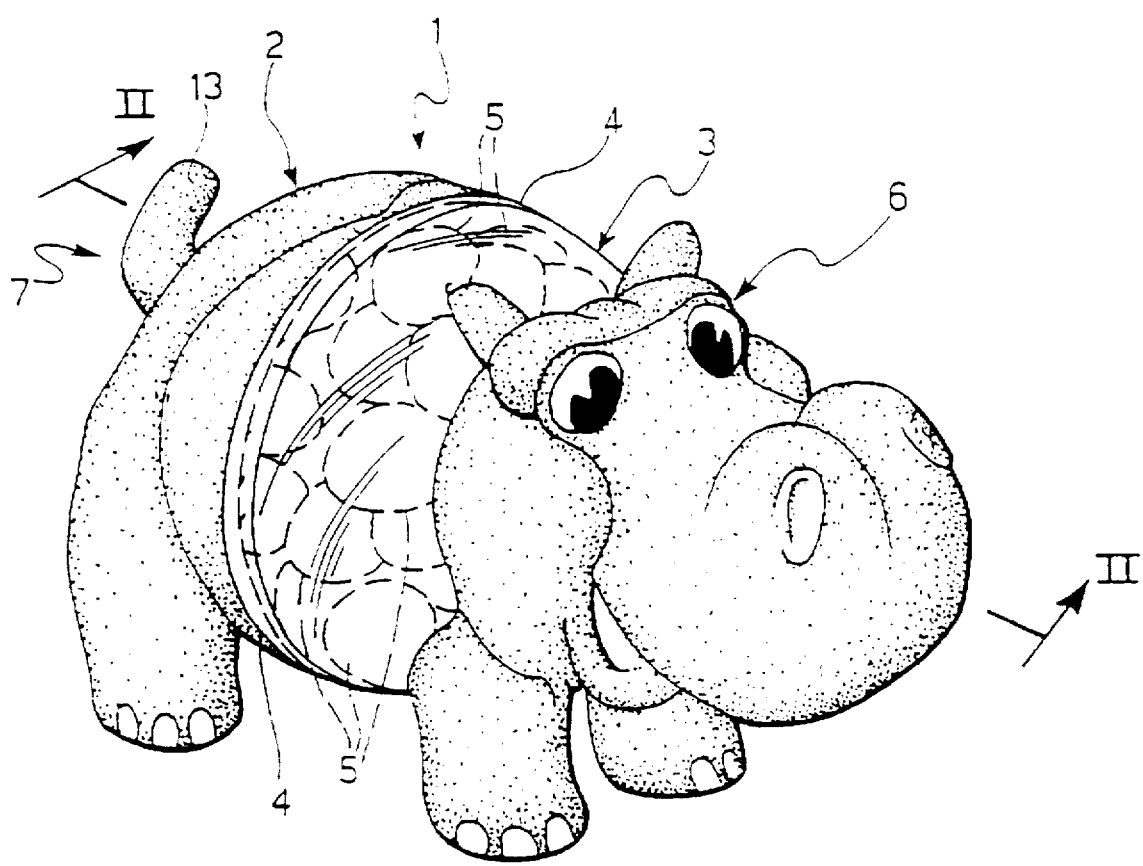
FIG. 1 is a general perspective view of a container according to the invention.

In the drawings, a container (for example for confectionery), which in the embodiment illustrated here takes the form of a little animal, for example a little hippopotamus, is generally indicated 1.

In a structural configuration which is generally known (See for example U.S. Pat. No. 4,593,817 mentioned earlier) the container 1 comprises essentially an egg-shaped casing formed by a (generally lower or rear) first shell 2 of rounded shape and by a further, generally front or upper, shell 3 of ogival or dome shape.

Naturally the terms "lower" and "rear", "upper" and "front" used above refer to the general posture of the animal represented by the container and are not to be interpreted in a limitative manner.

The shells 2, 3 are usually made of plastics material, preferably non transparent for the shell 2 and transparent for the shell 3, and are joined with their open ends in frontal mating relationship.

An adhesive strip 4 (See FIG. 1), applied to the container during assembly after the inner cavity defined by at least one of the shells 2 and 3 (typically the dome 3) has been filled with products such as food products, for example chocolate eggs 5, holds the shells 2 and 3 together.

The strip 4 may be removed when desired to allow the shells 2, 3 to be separated for access to the products 5 in the container.

Two shaped auxiliary bodies 6, 7 (front and rear respectively, still with reference to the posture of the animal), also usually made of plastics material, are provided to give the hollow casing formed by the shells 2 and 3 animal-like or, if required, human-like characteristics. In the selected embodiment, the front body 6 reproduces the features of the animal's face and front legs; the rear body 7 reproduces the features of the hindquarters and/or hind legs of the same animal.

Naturally, the embodiment illustrated is chosen purely by way of example.

In greater detail, it may be seen that the front body 6 is formed, in the embodiment illustrated (see particularly the sectional view of FIG. 2), by a single shaped piece. This could however include two or more elements, that is (for example) an outer body comprising the face and the front legs of the animal, except for the eyeballs and the tongue, and an inner body including appropriately shaped parts defining the animal's eyeballs and tongue. The inner body could be joined to the body so that the animal's eyeballs and tongue appear through corresponding apertures in the outer body.

However it is constituted, the body 6 usually has a general shell shape which fits together to complement the ogival shape of the shell 3 of the egg-shaped casing. This means that, following well known principles, the body 6 may be fitted onto the shell 3 so as to cover it at least in part.

In an important characteristic of the present invention, the coupling of the front body 6 and the shell 3 is not fixed (as in the case of the animal shown in U.S. Pat. No. 4,593,817 already mentioned several times) but movable. To this end, the body 6 is provided with an inner appendage 8 with an enlarged head 9 formed by two resilient half-conical parts. The appendage 8 is therefore able to pass like an arrow through an aperture or hole 10 in the apex of the shell 3.

As a result, the body 6 may be fitted to the shell 3 by the insertion of the appendage 8 through the aperture 10 until the head portion 9 projects inside the shell 3. At this point the resilient half-conical parts, which were compressed by the passage through the hole 10, snap apart to attach the body 6 onto the shell 3.

Figure 2:
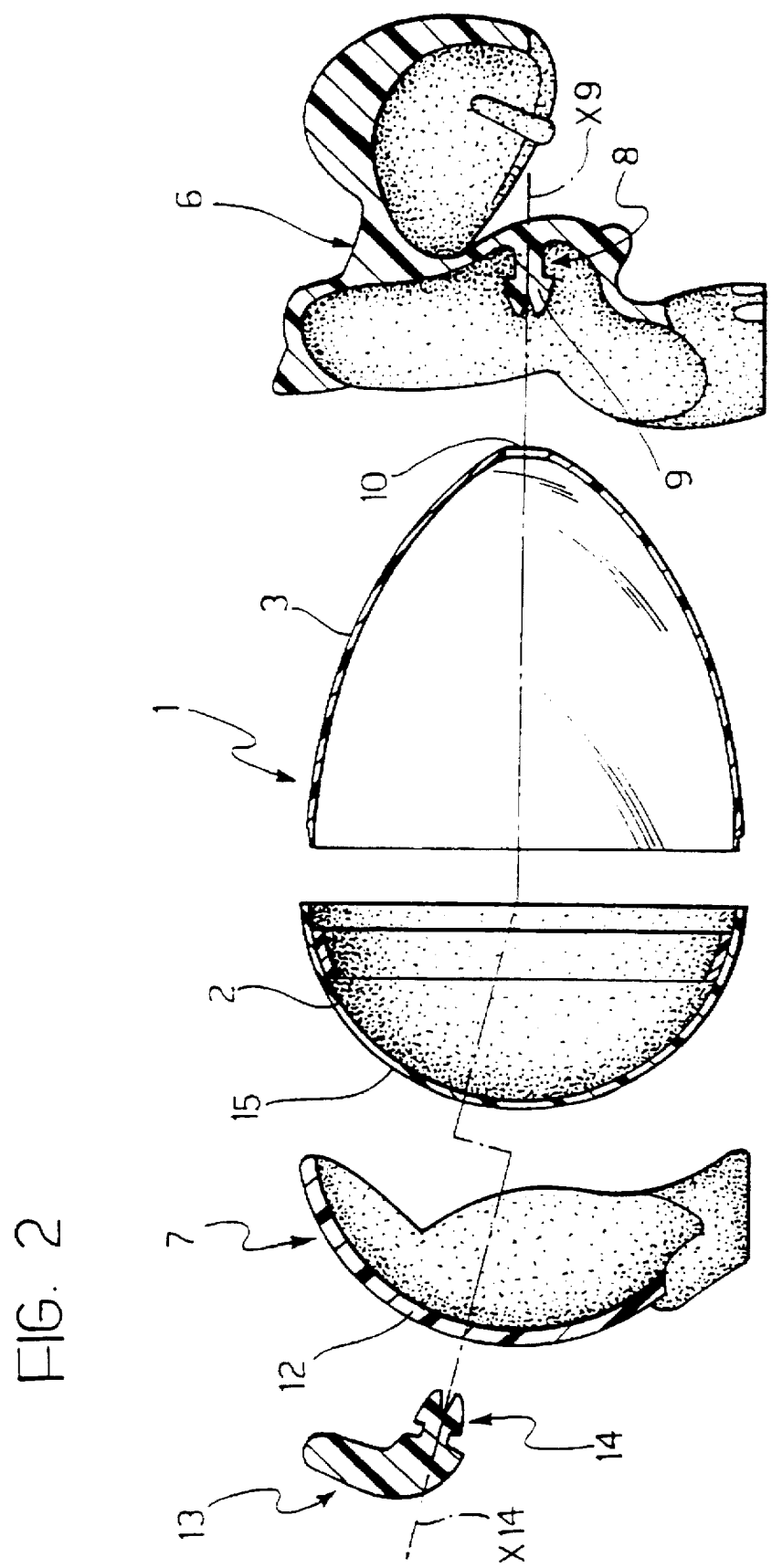
FIG. 2 is an exploded median section, taken on the line II—II of FIG. 1, showing the component parts of the container of FIG. 1.
Figure 3:
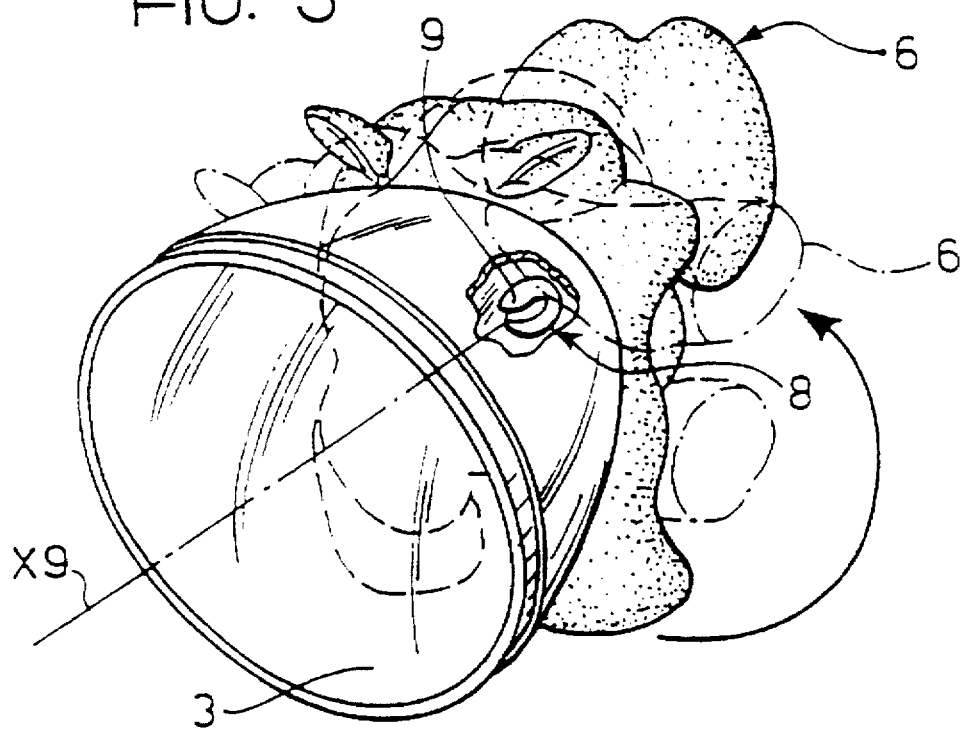
FIGS. 3 and 4 illustrate in detail the characteristics of movement of the various component parts of the container.

The body 6 may therefore be rotated with respect to the shell 3 about an axis of rotation X9 which substantially coincides with the main longitudinal axis of the appendage 8 (See especially FIGS. 2 and 3).

An approximately similar arrangement is used to attach the rear body 7.

In this case, the rear body 7 has a through-hole 12 (FIG. 2) through which the tip of a shaped body 13, also provided with an enlarged head 14 formed by two resilient half-conical parts, may be passed. The body 13 may be shaped so as to form, for example, the animal's tail. The rear shell 2 also has a through-slot 15 extending for a certain distance along a meridian line of the shell 2 (which, as described, has a rounded shape).

Figure 4:
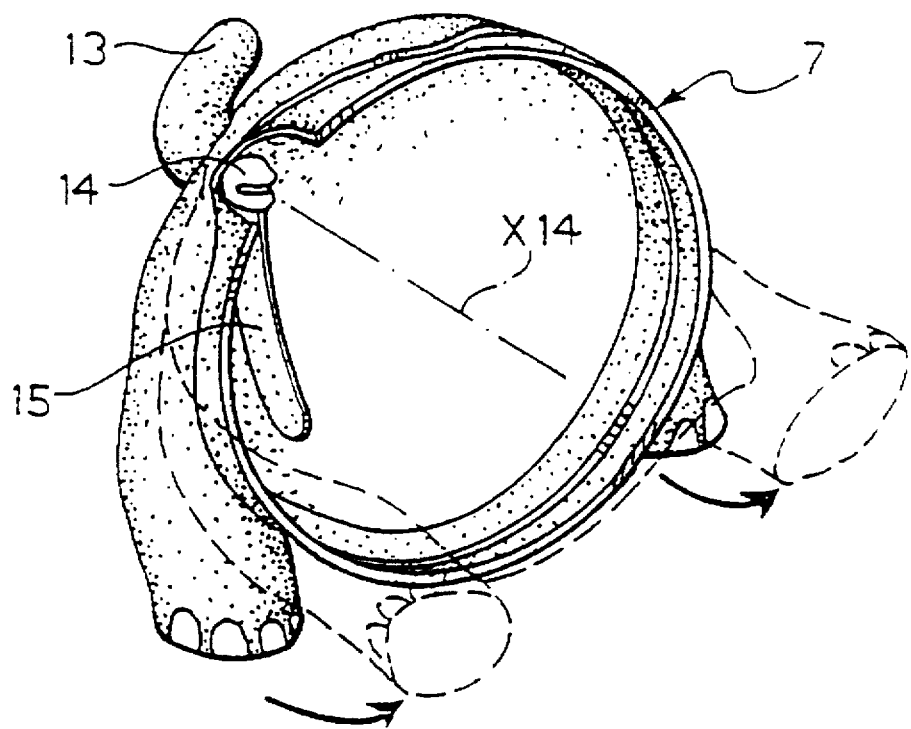

Therefore, the body 7 may be moved relative to the shell 2 (which has a rounded shape, that is with circular curvature about two axes) both by:

rotation about an axis X14 corresponding to the axis of the head 14 of the body 13, and by variation of the position of the axis X14 relative to the shell 2, by sliding of the head 14 and the body 7 along the arcuate path defined by the slot 15. The above accords with the principles illustrated in greater detail in FIG. 4 and exploits the ability of the tail 13, which is slidably engaged in the slot 15, to fix the body 7 in contact with the shell 2 of the casing.

Naturally, the arrangement used to mount the body 7 could also be used to mount the body 6 and vice-versa.

Figure 5:
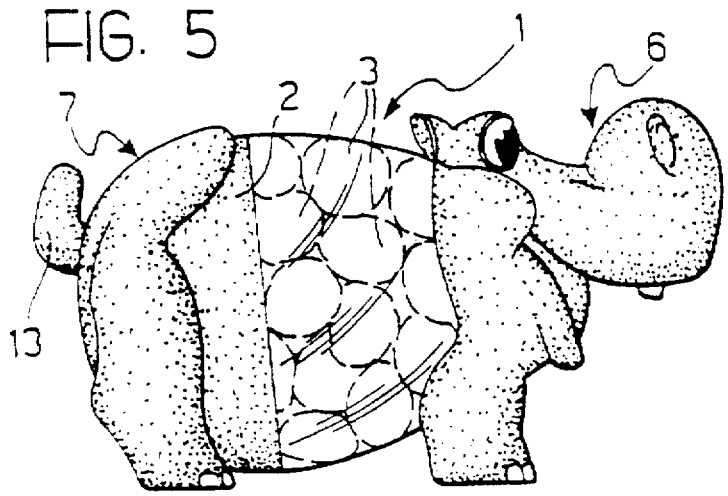
FIGS. 5 to 7 show the container according to the invention in various positions of use.
Figure 6:
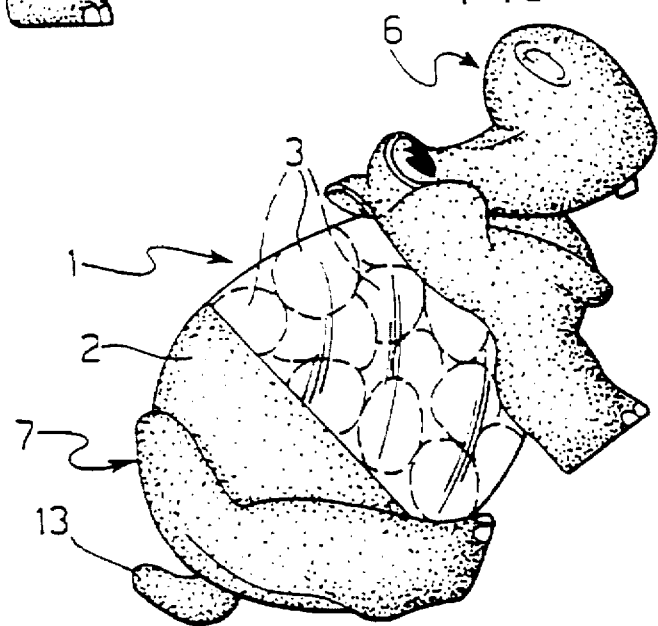
Figure 7:
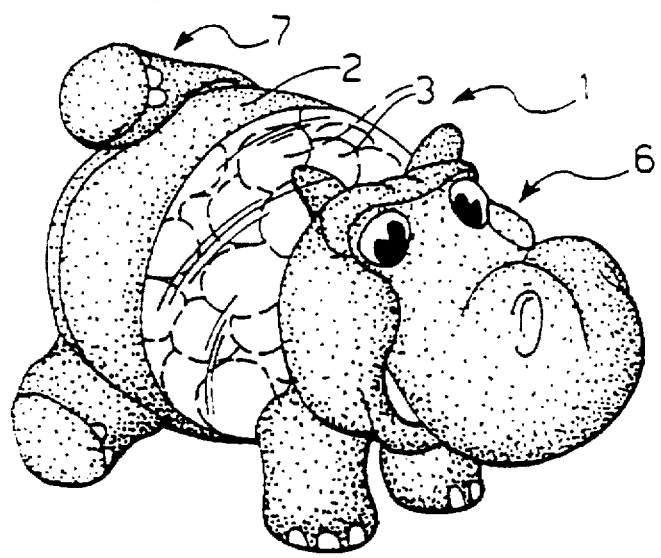

FIGS. 5 to 7 show schematically how, starting from a normal or walking position (FIG. 5) the animal container 1 according to the invention may be moved, for example, into a sitting position (FIG. 6) by suitable arrangement of the lower body 7 in such a way that it can support the remaining parts of the container 1 above a surface on which the body 7 is resting (after the stop element 13 has been slid along the slot 15 with the consequent angling of the body 7 relative to the shell 2), or into a half-reclining position (FIG. 7) with the hindquarters rotated through about 90° relative to the main part of the body.

Naturally, the positions illustrated are only some of those that the container according to the invention is able to assume.

It should also be appreciated that the entire surface of the shell 2 does not necessarily have to be rounded (although this arrangement appears preferable, above all to ensure simplicity of construction): it is in fact sufficient for the parts intended to mate with the dome defined by the inner surface of the auxiliary body 7 to be rounded.

It should also be noted that the device does not necessarily need to include two auxiliary bodies 6 and 7: the presence of one of these bodies is sufficient to achieve the purpose of the invention.

Furthermore, it is important to note that the fact that the auxiliary body 7 bears against a rounded surface of the shell 2 does not necessarily mean that the entire inner surface of the body 7 has to be rounded in order to mate with the surface of the shell 2. For this purpose, the complementary rounded capping surfaces (which are in any case a preferred arrangement) could be replaced by non-rounded caps intended to remain spaced from each other except at their peripheral regions: this is largely the arrangement illustrated for the body 6, the central portion of which is spaced from the shell 3.

Furthermore, at least some of the advantages of the invention could be maintained if, instead of achieving coupling between the shell 2 and the auxiliary body 7 at a rounded surface, this coupling were limited dimensionally so as to be achieved along an arcuate path of a different nature, for example by coupling at a cylindrical or conical surface.

Regarding use, as stated earlier, the application of the invention to the manufacture of containers reproducing the features of puppets or animals, although preferred, is not binding and the container of the invention may be used for other purposes.

I claim:

1. A container comprising a casing and at least one associated auxiliary body mounted on the casing, wherein:

the casing has at least a portion with a rounded surface;

the at least one auxiliary body has a portion with a rounded surface complementary to the portion of the casing having said rounded surface and the at least one auxiliary body is mounted on the casing so as to be movable relative to the casing along an arcuate path along the surface of said casing;

connection means are provided between the casing and the at least one auxiliary body for maintaining the at least one auxiliary body mounted on the casing while permitting movement of the at least one auxiliary body relative to the casing along the arcuate path; and wherein the at least one auxiliary body is also rotatable relative to the casing about an axis extending generally in a direction perpendicular to the surface of the casing, said axis being variable relative to the surface of the casing as a result of the at least one auxiliary body being movable relative to the casing along the arcuate path.

2. A container according to claim 1, wherein at least one of the casing and the at least one auxiliary body has a slot defining said arcuate path, while the other of the casing and the at least one auxiliary body has associated fixing means for cooperating with the slot for sliding movement there along and for fixing the at least one auxiliary body to the casing.

3. A container according to claim 2, wherein said associated fixing means cooperates with the slot in a penetrating and fastening relationship to hold the at least one auxiliary body on the casing.

4. A container according to claim 2, wherein the slot is provided in the casing and extends generally along a meridian line of the casing.

5. A container according to claim 2, wherein said associated fixing means is formed as an auxiliary element which gives the container the character of one of a human or animal.

6. A container according to claim 2, wherein the said at least one auxiliary body has an aperture intended to be aligned with the slot, and said associated fixing means is for extending in succession through the aperture and the slot.

7. A container according to claim 2, wherein at least one further auxiliary body is coupled to the casing so as to be rotatable about an axis extending generally in a direction perpendicular to the surface of the casing.

8. A container according to claim 7, wherein one of the casing and the at least one further auxiliary body has an aperture and the other of the said casing and said at least one further auxiliary body has a fastening formation for penetrating the aperture.

9. A container according to claim 2, wherein the casing includes two shells each with an open end, the two shells being connectable to each other by mating together the open ends.

10. A container according to claim 9, wherein at least one of the shells has a rounded surface.

11. A container according to claim 10, wherein the other of the shells is dome-shaped so that the casing is generally egg-shaped.

12. A container according to claim 11, wherein the at least one auxiliary body is coupled to the shell having a rounded surface while the at least one further auxiliary body is coupled to the other, dome-shaped shell.

* * * * *

UNITED STATES PATENT AND TRADEMARK OFFICE
CERTIFICATE OF CORRECTION

PATENT NO. : 5,632,377
DATED : May 27, 1997
INVENTOR(S) : PIETRO FERRERO

It is certified that error appears in the above-identified patent and that said Letters Patent is hereby corrected as shown below:

On the title page, item:

[30] Foreign Application Priority Data

"2584/92" should read -- 2584/92-6 --.

Signed and Sealed this

Ninth Day of September, 1997

Attest:

BRUCE LEHMAN

Attesting Officer

Commissioner of Patents and Trademarks